W. E. ANDREW.
PROCESS AND APPARATUS FOR RENDERING FATS.
No. 179,883. Patented July 18, 1876.
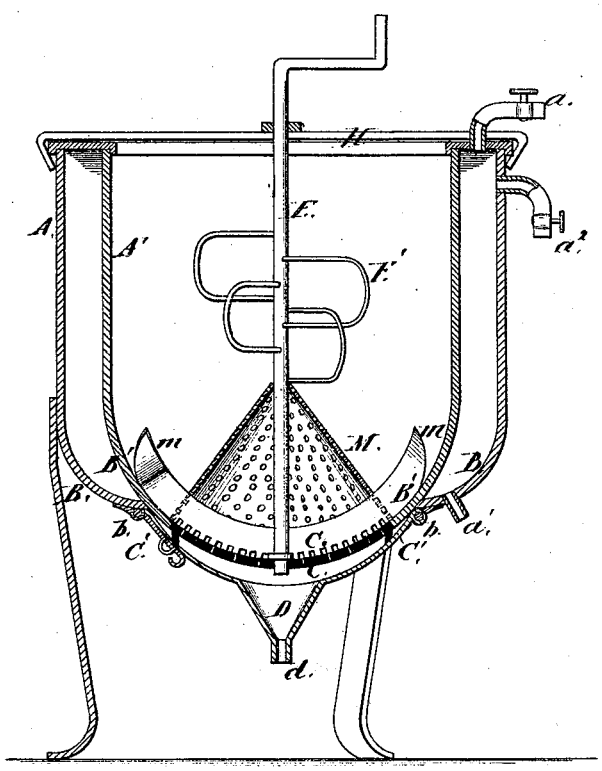

UNITED STATES PATENT OFFICE.

WILLIAM E. ANDREW, OF NEW YORK, N. Y.

IMPROVEMENT IN PROCESSES AND APPARATUS FOR RENDERING FATS.

Specification forming part of Letters Patent No. 179,883, dated July 18, 1876; application filed June 23, 1876.

*To all whom it may concern:*

Be it known that I, WILLIAM E. ANDREW, of New York city, in the county of New York and State of New York, have invented certain new and useful Improvements in Rendering Fats; and I do hereby declare that the following is a full, clear, and exact description thereof, which will enable others skilled in the art to which it appertains to make and use the same, reference being had to the accompanying drawings, and to the letters of reference marked thereon, which form a part of this specification.

To enable others skilled in the art to make and use my invention, I will now proceed to describe what I consider the best manner and means of carrying out the same.

I have discovered by actual experiment that, in order to prevent rendered oil from having an animal odor or taste, it should be removed from the rendering-vessel as fast as it becomes sufficiently liquefied to run.

I have also discovered that, to prevent fermentation during the process of rendering, as well as to avoid the trouble, delay, and expense of subsequent treatment of the oil, no water should be allowed to come in contact with the fat during the process of rendering.

The great desiderata in this art are, first, to avoid the contact of water with the fat at any stage of the process; second, to render as fast as possible without scorching; and, third, to carry the rendered oil away from the membrane and other tissue as fast as possible, so as to avoid any liability to animal odor or flavor.

To supply these wants this invention is intended. It is an improvement on my patent of February 1, 1876, No. 172,942.

The nature of my invention relates to rendering fats for various purposes, among which I mention the caul or other fat of beeves, rendered and clarified by the process and means specified in my aforesaid patent, for the purpose of utilizing the product, by combining the same with other ingredients in the manufacture of artificial butter.

My invention consists, first, in a jacketed kettle, with a perforated hinged falling bottom, of considerably smaller diameter than the kettle.

Second, in a jacketed kettle, having each of the portions thereof extend downward and inward under the body of the kettle, and there meeting and forming a steam-tight joint, leaving sufficient area open for the reception of the perforated bottom.

Third, in providing this hinged bottom with a perforated upper surface, and a chamber to catch the leakage, the inner wall of which is perforated, and also in having a receiver beneath the perforated plate or bottom proper, and a conveying-tube leading therefrom, so constructed as to make a tight joint with the body of the kettle, and being provided with suitable means for securing it to the kettle in a closed condition.

Fourth, in an agitator or stirrer, consisting of a vertical shaft, having radial arms extending to near the inner surface of the kettle, and provided at its upper end with a crank or other suitable means for connection with a steam-engine or other motive power. A framing from the upper portion of the kettle converges toward the center and furnishes a bearing for the upper portion of the shaft, and the lower portion of the same is suitably journaled in the perforated bottom, proper means being provided to prevent the stirrer from falling when the bottom is lowered. A series of twisted leaves or plates, rigid with the shaft near its bottom, is so constructed that by turning the shaft in one direction the said leaves serve to throw whatever substances which may have gravitated toward the bottom up again into the mass, and efficiently to assist the complete and continued agitation of the same.

Fifth, in a strainer, rigidly attached to and revolving with the vertical shaft. This strainer is of sufficient diameter to cover the perforated bottom.

Sixth, in a metal brush, of form to correspond with the upper surface of the perforated bottom, over which it sweeps, to clear said bottom of any clogging membrane. It is rigid with, radial to, and revolves with, the shaft.

Seventh, in a process consisting in rendering fat without water or steam coming in contact therewith, in agitating the same by power during the process of rendering, and conveying the rendered oil away as fast as rendered, and in removing the membrane, tissue, &c., through the bottom of the kettle, saving time and trouble, labor and expense.

In rendering oil for the manufacture of artificial butter, I select the finest beef's fat, and place it in an ordinary meat-hasher. This may be so arranged above the rendering-vessel that as fast as the fat is hashed fine it will fall into the same. As fast as the oil separates it passes through the strainer, thence through the perforated bottom into the receiver, and is conveyed away through the conveying-pipe.

The drawing is a vertical section of my invention.

Referring to the drawing, A A' is an ordinary jacketed kettle, having a steam-chamber between the two portions, with a steam-inlet at $a$, an outlet for water of condensation at $a^1$, and a steam-gage, blow-off, &c., at $a^2$. At a sufficient distance from the top, both these portions incline inward, and finally meet at a considerable distance under the body of the kettle, and there forming a steam-tight joint. This inwardly-inclined portion B B' forms a portion of the bottom of the kettle, and increases the heating-surface. $b$ is a projection downward from the part B, forming an annular recess inside corresponding to a similar recess in the hinged bottom, to be described hereafter.

It will be seen that the sides and a considerable portion of the kettle are surrounded by the steam-chamber.

D is the receiver, preferably of the form of an inverted cone, as described in my former patent, and its outer edge corresponds in form and size to the projection $b$, against which it abuts when the bottom is closed.

C is a perforated bottom within the circumference of the upper rim of the receiver D, and it is of smaller diameter, whereby a leak-chamber, C', is formed. This perforated bottom is slightly dishing. This portion of my invention—i. e., the receiver D, perforated bottom, and conveying-pipe $d$—is formed in one, and is suitably and securely hinged to the lower surface of the kettle; and on the opposite side from the hinge, or at other proper places, are suitable means for fastening the hinged bottom up in a closed condition, and in such closed condition a double connection is made—i. e., the periphery of the perforated bottom abuts against the lower and inner edge of the kettle, or extends upward inside thereof, and is flush with the inner surface of the kettle bottom; and the upper edge of the body of the receiver abuts against the projection $b$, both these connections making close joints with the leak-chamber between them.

E represents a vertical shaft, upon which are rigidly attached suitably-formed radial arms E'. This shaft is suitably journaled in proper bearings in the perforated bottom, and at the top in a framing, H, which may be made of any number of cross-pieces converging toward the center, at which point it furnishes the shaft-bearing. A crank at the top of the shaft E furnishes means for the connection of steam-power or other motor.

Rigidly attached to the shaft E is a revolving strainer, M, the lower surface of which is of sufficient diameter to cover the perforated bottom C. It is provided with twisted leaves $m$, rigidly attached to the lower portion. The construction and arrangement of this strainer are such that its lower portion will sweep very near to the surface of the bottom of the jacketed vessel, and prevent any scrap or membrane from passing under the edges, and in this it is assisted by the action of the twisted leaves, which throw the same outward and upward into the mass.

The gravitating portions of the animal membrane fall upon the inclined outer surface of the cone. Gravitating still further, they meet the upward and outward current, caused by the action of the twisted leaves, and are again thrown up into the mass, until they are sufficiently melted to pass through the perforations in the cone.

I have found by actual experiment that a portion of the finer membrane, or animal tissue, will pass through the strainer and endanger the clogging of the perforated bottom; but I have devised a means for successfully preventing any such disaster. Using the lower inner portion of the cone as a bearing or attaching surface, I employ two or more metal brushes, which are rigidly connected with the shaft E, and revolve with it. These brushes are formed of one or more strips of metal, properly kerfed or cut, so as to form numerous yielding teeth. The metal should be of a quality that will allow of the teeth regaining their original vertical position. Several of these prepared strips may be bound together in such manner that they may be readily removed or replaced, and any desired number may be used. The brushes are of conformation and arrangement to allow the yielding teeth to pass over the perforated bottom and keep it open by the revolutions of the shaft.

When it is desired to empty the scrap, the shaft with its appendages may be raised entire, and the scrap, passing down outside and under the cone, may be removed through the falling bottom, as is obvious.

To prevent loss of heat, and to increase the efficiency of my invention, the kettle may be covered with any suitable device adapted to be removed at will.

The strainer M may be used as a false bottom, if desired.

I claim—

1. The jacket-kettle A A', the part B B' extending inward under the same, and the projection b, in combination with a hinged bottom, as and for the purpose described.

2. The hinged bottom, consisting of the perforated portion C, the receiver D, the outlet d, and the leak-chamber C', in combination with a jacketed kettle and suitable fastenings thereto, as specified.

3. The agitator E E', having the twisted leaves m, convex on their lower surfaces, to correspond with the concave upper surface of the jacketed kettle, in combination with said jacketed kettle A A' B B', and a hinged bottom, substantially as specified.

4. The revolving strainer M, in combination with a jacketed kettle, having a perforated bottom, as specified.

5. The metal brush, convex, to correspond with the concave surface of the perforated bottom, in combination with shaft E, strainer M, bottom C, and jacketed kettle, as specified.

6. The within-described process of dry-rendering, consisting in subjecting animal fat to heat radiated from a jacketed kettle, agitating the same while being rendered, automatically preventing the gravitation of membrane and clogging of the outlet, and conveying the oil away as fast as rendered, as and for the purpose specified.

In testimony that I claim the foregoing as my own, I affix my signature in presence of two witnesses.

WILLIAM E. ANDREW.

Witnesses:
H. CLAY SMITH,
M. V. HALL.